United States Patent [19]

Oda et al.

[11] Patent Number: 4,564,872
[45] Date of Patent: Jan. 14, 1986

[54] MAGNETIC HEAD DRIVING UNIT

[75] Inventors: Yasuyuki Oda; Kazuhiko Iwase, both of Tokyo, Japan

[73] Assignee: Tokyo Shibaura Denki Kabushiki Kaisha, Kawasaki, Japan

[21] Appl. No.: 523,775

[22] Filed: Aug. 16, 1983

[30] Foreign Application Priority Data

Aug. 26, 1982 [JP] Japan ................................ 57-148216

[51] Int. Cl.⁴ ............................................... G11B 5/55
[52] U.S. Cl. .................................................... 360/78
[58] Field of Search ............... 318/566, 626, 627, 635; 360/78

[56] References Cited

U.S. PATENT DOCUMENTS

| | | | |
|---|---|---|---|
| 4,375,611 | 3/1983 | Greig | 318/626 |
| 4,395,742 | 7/1983 | Ostroff | 360/78 |
| 4,479,177 | 10/1984 | Berti | 364/159 |

*Primary Examiner*—George G. Stellar
*Attorney, Agent, or Firm*—Cushman, Darby & Cushman

[57] ABSTRACT

A magnetic head driving unit according to the present invention includes a microprocessor. The microprocessor determines whether a first seek operation for positioning the head on an initial position of a cylinder is completed. If the first seek is not completed, analog switch is triggered ON by a control signal from the microprocessor. Upon the ON operation of the analog switch, the limiter restrains a driving current for a motor in a predetermined value, thereby preventing overrun of the motor.

3 Claims, 13 Drawing Figures

MAGNETIC HEAD DRIVING UNIT

BACKGROUND OF THE INVENTION

The present invention relates to an improved magnetic head driving unit for driving a positioning mechanism of a magnetic head.

In general, the operations of a magnetic disk unit can be classified roughly into four modes: positioning (normally referred to as a seek operation) of a magnetic head (head), a search operation for collating a desired record, data write operation and data read operation. The positioning of the head is normally performed by a driving unit as shown in FIG. 1.

The magnetic disk unit is provided with a servo head for reading a servo data from the disk and a read/write head for reading and writing data from or into the disk. These heads are mounted on a carriage 1. The motion of the carriage 1 performs a seek operation. The carriage 1 is driven by an actuator motor 1 which is usually a voice coil motor. Reading data from a disk, the servo head supplies the data to the position detector 3. The position detector 3 produces a head position signal a and a cylinder pulse SP each time the servo head traverses a track on the disk. The cylinder pulse SP is supplied to a microprocessor 4. The microprocessor 4 computes the difference between a track on which head currently positions and a target track specified by a host system. The current head position on the track can be derived from the cylinder pulse SP. The microprocessor 4, then loads target velocity data into a register 5. This data (digital) is associated with a target velocity signal (analog) corresponding to the difference between tracks. Various target velocity data corresponding to the track differences may be prestored in a read only memory (ROM) 4a in a microprocessor 4 as a reference table. The target velocity data in the register 5 is then fed to a digital/analog converter 6 (D/A converter). The D/A converter 6 converts the target velocity data in digital form into a target velocity signal in analog form (normally, a voltage signal) to be supplied to a summing amplifier 7. The output of the D/A converter 6 is supplied to an analog switch 10c which is controlled by a control signal from the microprocessor 4.

The position detector 3 produces the position signal a to a phase compensator 13 and a differentiator 9. The differentiator 9 differentiates the position signal a to perform a velocity signal, which is supplied to a summing amplifier 7 through an analog switch 10a, for example model LF 13201 manufactured by National Semiconductor Corporation. At this time, an analog switch 10b is closed to prevent the supplement of the output signal from the phase compensator 13 to the summing amplifier 7. Also, the analog switches 10a, 10b and 10c are controlled by the control signal from the microprocessor 4. The summing amplifier 7 performs subtraction between the target velocity signal and the velocity signal from the differentiator 9 and produces an output signal corresponding to the velocity difference. This output signal is supplied to a power amplifier 8. The power amplifier 8 supplies a driving current corresponding to the output signal from the summing amplifier 7 to the actuator motor 2. Therefore, the actuator motor 2 drives a carriage 1 with acceleration corresponding to the output signal from the summing amplifier 7. Then, the cylinder pulse SP from the position detector 3 is supplied to the microprocessor 4 every time the head crosses the track. Receiving the cylinder pulse SP, the microprocessor 4 computes again the difference between the currently head-positioned track and the target track. Then, the microprocessor 4 accesses the reference table in the ROM 4a in accordance with the updated track difference to obtain the target velocity data, which is again loaded in the register 5. Thus, the velocity control of the carriage 1 is performed. The microprocessor 4 may be constructed by a 8-bit microprocessor 8085 manufactured by Intel, Co. USA.

When the head reaches the target track, the analog switch 10a and 10c turn off and the analog switch 10b turns on. Then, a closed loop comprising the phase compensator 13, analog switch 10b, summing amplifier 7, power amplifier 8, motor 2, carriage 1 and position detector 3 is formed to accurately fix the head on the target track.

The maximum value of the driving current (maximum current) supplied to the actuator motor 2 is constrained to a predetermined value by the summing amplifier 7 which normally becomes an input stage for the power amplifier 8. This is because the restraint of the maximum current at the power amplifier 8 increases the tolerances of the power source and winding resistance of the actuator motor 2. The restraint of the maximum current is implemented by a limiter 12 provided at the summing amplifier 7 as shown in FIG. 2. That is, any of the input signals V1, V2 or V3 from the analog switch 10b, the analog switch 10c or analog switch 10a is input through registers R1, R2 or R3 respectively to one input terminal (negative) of an operational amplifier 11 (op amp). The positive terminal of the op amp 11 is grounded through a resistor R4. Further, a limiter 12 and a resistor R5 are parallely connected between the output terminal and the negative input terminal of the op amp 11.

From the output terminal of the op amp 11, the output voltage V0 of which amplitude is restrained by the limiter 12 is produced to be supplied to the power amplifier 8 shown in FIG. 1. The limiter 12 may be constructed with any of the known circuits shown in FIGS. 3A to 3D. The limiter 12 may also be an open circuit. In these circuits shown in FIGS. 3A to 3D, D1, D2, D3 denote zener diodes, D4 and D5, diodes and Ra through Rd, resistors.

FIGS. 4A through 4E show characteristics of any of the input voltages (V1, V2, V3) and output voltage V0. FIG. 4A shows a contour of the input and output voltages of the summing amplifier 7 when the limiter 12 is an open circuit. FIGS. 4B through 4E show individual contours of the input voltages V1, V2, V3 and output voltage V0 of the summing amplifier 7 when the circuits shown in FIGS. 3A through 3D apply to the limiter 12. In FIGS. 4B, 4C and 4E, $V_{D1}$ and $V_{D3}$ denote reverse voltages of the zener diodes, $V_{Z2}$ and $V_{Z3}$ denote forward voltages of the zener diodes and $V_D$ denotes forward voltage of the diode. The maximum current for the actuator motor 2 is thus restrained, so that the maximum current normally flows for short time at the initial of the velocity control period of the carriage 1 when the head is positioned.

In worst case, however, such abnormal situation may occur that the maximum current continues to flow until the power supply for the actuator motor 2 turns off. As a result, the overrun of the actuator motor 2 damages a magnetic disk or a mechanical sections of the access mechanism. Further, in a magnetic disk unit adopting high density recording, slight (minute) mismatching of alignment of the heads or mismatching of the individual mechanical sections of the access mechanism may occur, thereby loosening compatible recording. To solve the above drawbacks, the prior art system adopts a particular circuit for detecting the abnormal conditions, stopping the power supply to the actuator motor 2, and retracting the head. However, the above circuit does not always function satisfactorily due to the operating time restriction etc. Therefore, it is difficult to implement a perfect prevention of such abnormal status.

SUMMARY OF THE INVENTION

An object of the present invention is to provide an improved magnetic head driving unit wherein at first seek operation during the access mechanism operations, the maximum current for the actuator motor is restrained with a simple-structured circuit, thereby perfectly preventing the damage of the magnetic disk unit caused by the overrun of the motor and improving the whole reliability of the magnetic disk unit.

To achieve the above object, a magnetic head driving unit according to the present invention comprises magnetic head means, carriage means for implementing a seek operation of the magnetic head, motor means for driving said carriage means, data processing means for determining whether the first seek operation is completed, which positions the head on a predetermined cylinder when the magnetic head driving unit is powered, analog switch means operated by a control signal from said data processing means after the determination, and driving current control means for restraining the driving current for the motor in a predetermined value at the first seek operation when said analog switch turns on, thereby restraining the maximum acceleration of said carriage means.

BRIEF DESCRIPTION OF THE DRAWINGS

Other objects and features of the present invention will be apparent from the following description taken in connection with the accompanying drawings in which:

FIGS. 4A through 4E show input and output characteristic curves of the summing amplifiers shown in FIGS. 3A through 3D, wherein FIG. 4A shows the curve when the summing amplifier is open circuit, and FIGS. 4B through 4D show the curves corresponding to the summing amplifiers shown in FIGS. 3A through 3D;

DETAILED DESCRIPTION OF THE PREFERRED EMBODIMENT

Figure 5:
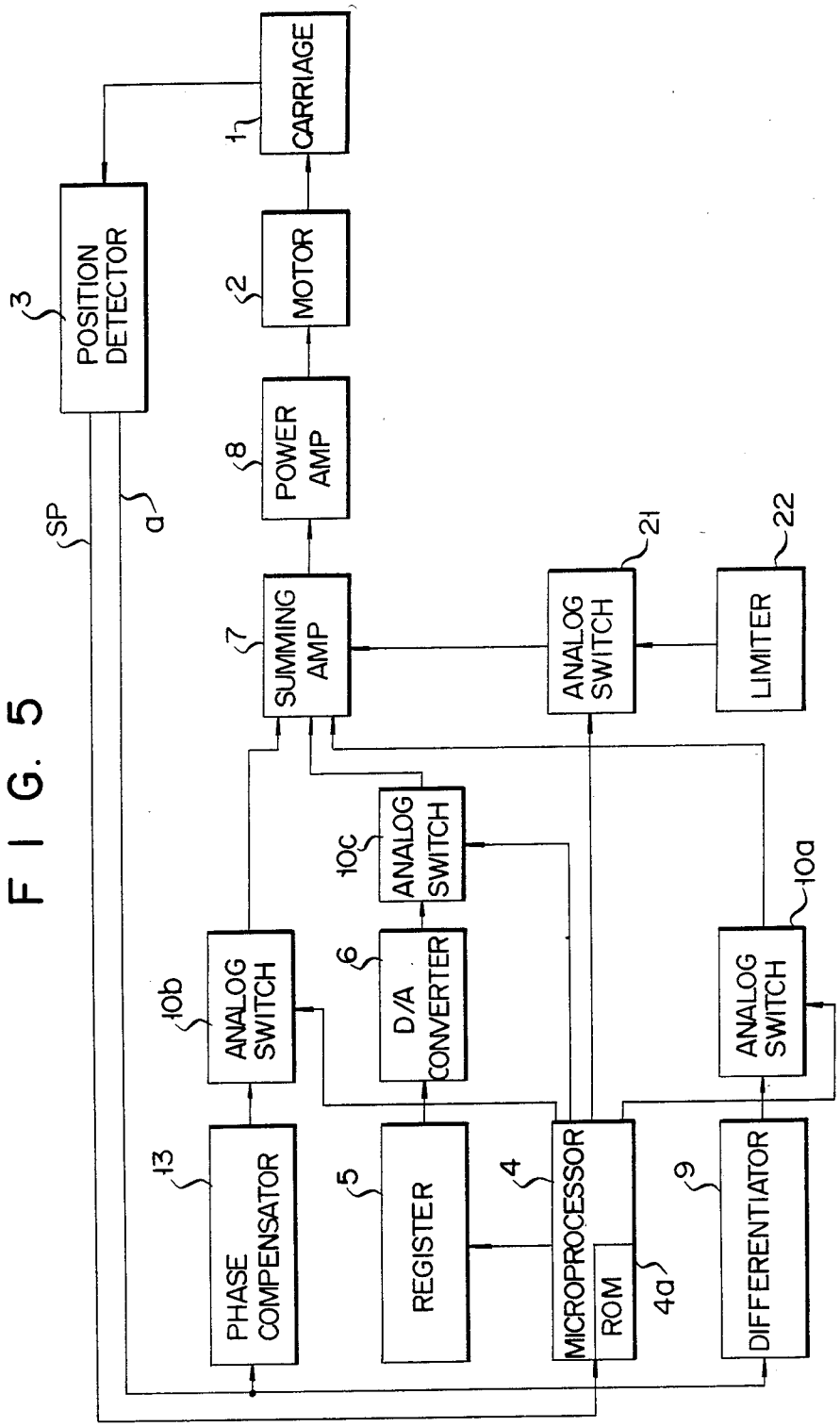
FIG. 5 is a block diagram showing an embodiment of the present invention.

Now an embodiment of the present invention will be described referring to the drawings. FIG. 5 is a block diagram showing a magnetic head driving unit of the present invention. An analog switch 21, for example model LF 13201 manufactured by National Semiconductor Corporation operates in accordance with a control signal r such as a ready signal produced from the microprocessor 4. The microprocessor 4 determines whether a first seek operation for positioning the head at an initial position is completed. If the first seek operation is not completed, the microprocessor 4 produces a control signal r to trigger a analog switch 21 on. On the other hand, the microprocessor 4 produces a control signal r to trigger the analog switch 21 off after the first seek operation is completed. The operation of the analog switch 21 causes a limiter 22 as driving current limiting circuit to restrain the input voltage for the summing amplifier 7 in a predetermined value. The output voltage from the summing amplifier 7 is input to the power amplifier 8 to be converted into the driving current for the actuator motor 2. In other constructions, the same numerals are used for the same parts in FIG. 1 and so a detailed description of these parts will be omitted.

Figure 2:
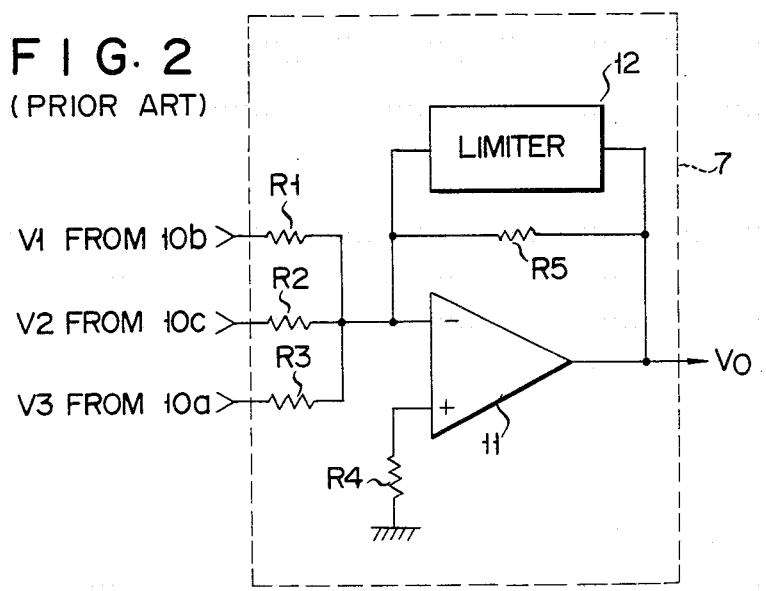
FIG. 2 is a detailed circuit diagram showing a conventional summing amplifier in a magnetic head driving unit in FIG. 1.
Figure 3A:
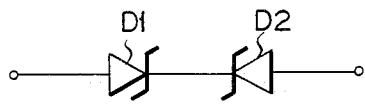
FIGS. 3A through 3D are circuit diagrams showing the summing amplifiers in FIG. 2.
Figure 3B:
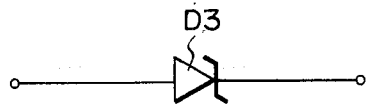
Figure 3C:
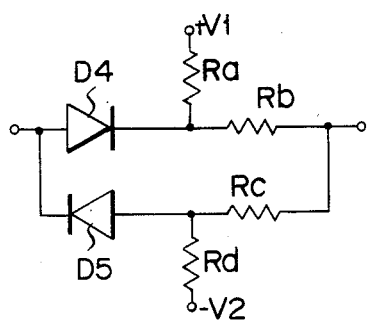
Figure 3D:
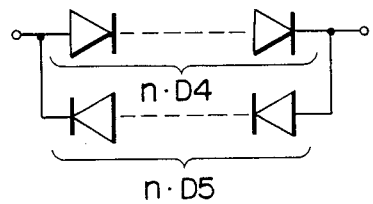
Figure 4A:
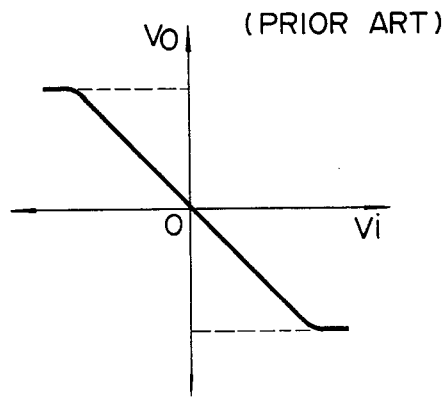
Figure 4B:
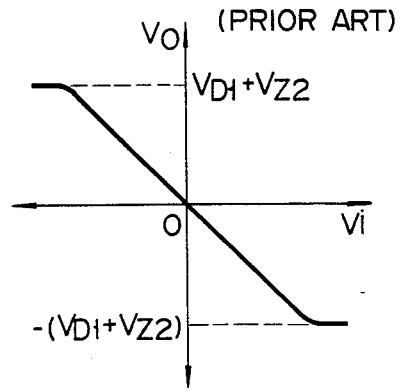
Figure 4C:
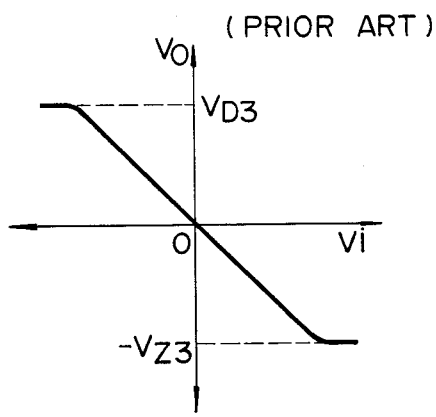
Figure 4D:
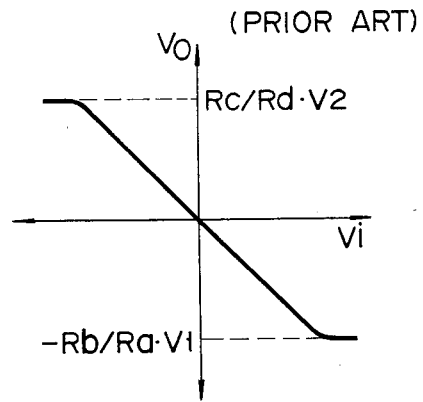
Figure 4E:
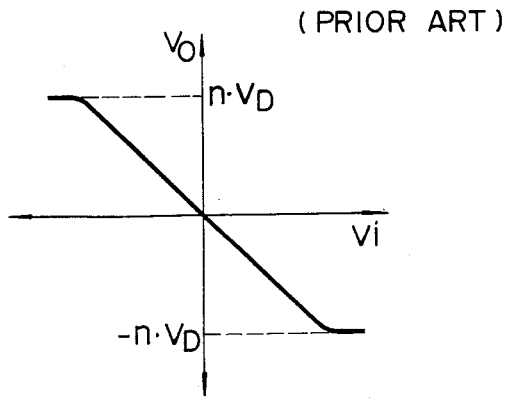
Figure 6:
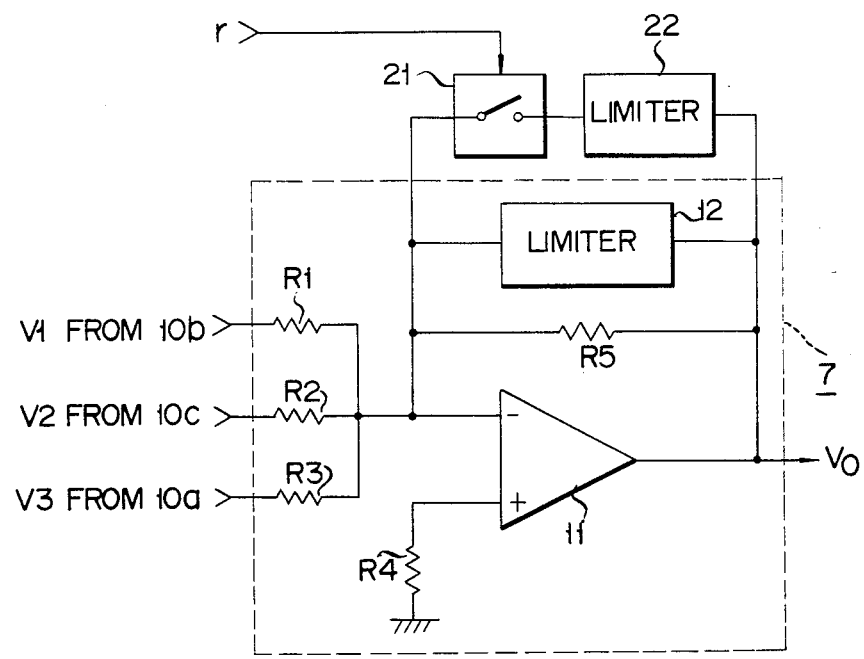
FIG. 6 is a detailed circuit diagram of a summing amplifier in the embodiment shown in FIG. 5.

The analog switch 21 and the limiter 22 are actually constructed as shown in FIG. 6. Input voltage from the analog switch 10b through the resistor R1, from the D/A converter 6 through the resistor R2 or from the analog switch through the resistor R3 is input to the negative input terminal of the operational amplifier (op amp). The limiters 21, 22 and the analog switch 21 are parallely provided between the input and output terminals of the op amp 11. The limiter 22 may be made of any circuits shown in FIGS. 3A through 3D. It is designed such that the absolute value of the clamp voltage of the limiter 22 is lower than that of the output voltage of the op amp 11 provided with only the limiter 12 when the analog switch 21 turns on. Since other constructions are same as those in FIG. 2, the same numerals are used for the same parts and so a detailed description of these parts will be omitted.

Now an operation of the magnetic disk driving unit constructed as described above will be described. When the magnetic disk unit is powered, the head is positioned to the first data track on the cylinder. That is, at the initialization immediately after the power turns on, a RTZ (Return to Zero) command is executed by the microprocessor 4. Therefore, the head moves from the innermost track of the disk to a guard band zone (not shown). Then, the microprocessor 4 receives the guard band signal from the position detector 3 and controls to move the head in reverse direction to access the first data track. Thus, the first seek operation is performed. Before the first seek operation is completed, the analog switch 21 turns on by a control signal r from the microprocessor 4.

Figure 1:
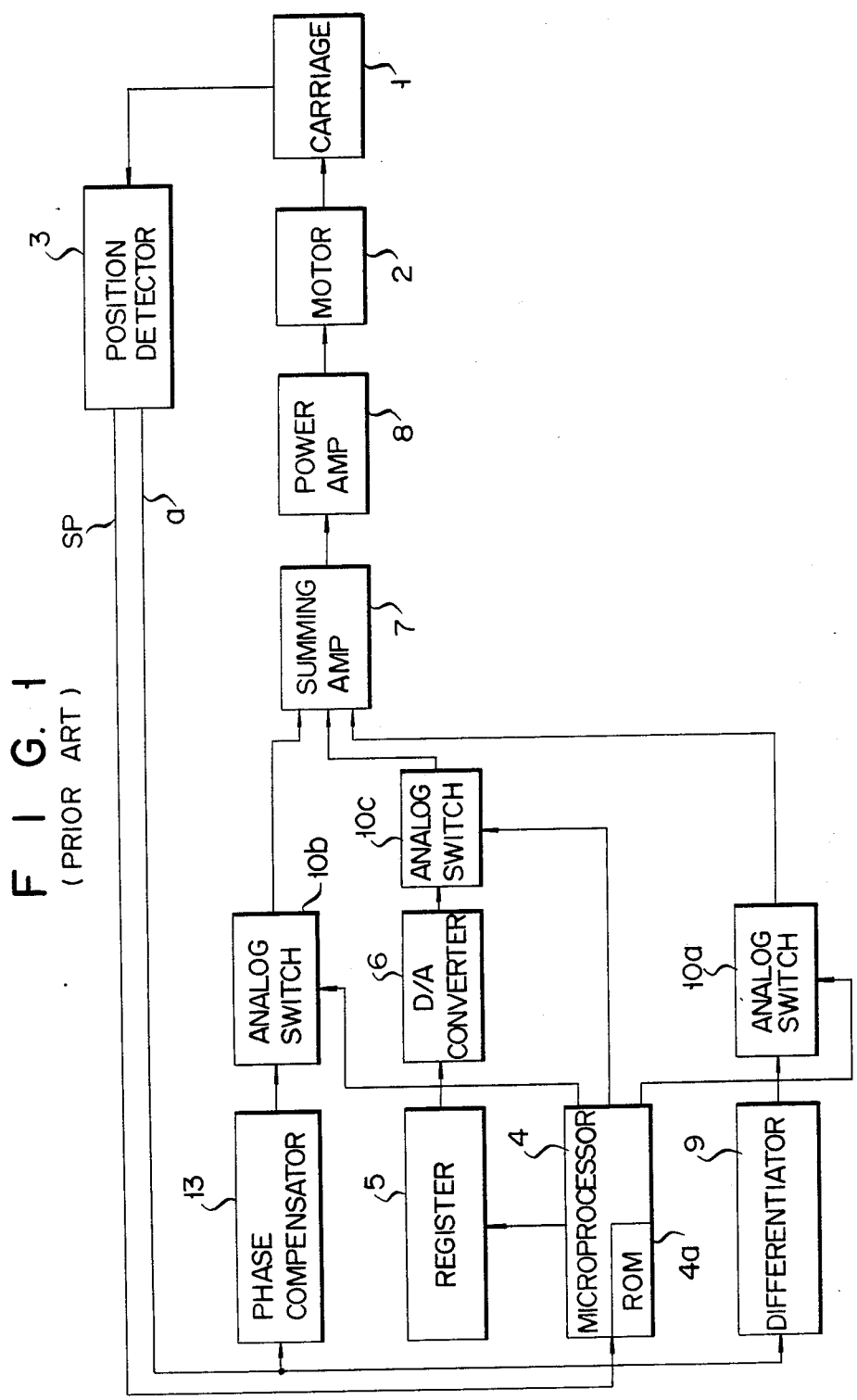
FIG. 1 is a block diagram showing a conventional magnetic head driving unit.

The microprocessor 4 can determine the completion of the first seek in accordance with a position signal of the head fed through the position detector 3 from the servo head, and the cylinder pulse SP. When the analog switch 21 is turned on, the output voltage V0 of the summing amplifier 7 is restrained to a predetermined voltage by the limiter 22. That is, as shown in FIG. 1 the summing amplifier 7 performs the subtraction of the target velocity signal input from the register 5 and the velocity signal input through the analog switch 10a from the differentiator 9 and produces an output signal corresponding to the velocity difference to the power amplifier 8. Therefore, the restrained output voltage V0 is input to the power amplifier 8 from the summing amplifier 7. The power amplifier 8 converts the voltage V0 into a driving current to be supplied to the actuator motor 2. Thus, the actuator motor 2 drives to accelerate the carriage 1. In this embodiment, the velocity of the carriage 1 is reduced to not less than half that of the normal seek operation since the output voltage V0 of the summing amplifier 7 is restrained to a predetermined voltage.

When the above first seek operation is completed, the microprocessor 4 produces the control signal r to turn off the analog switch 21. Thus, the summing amplifier 7 and the limiter 22 is disconnected so that the amplifier 7 produces an output voltage corresponding to the input signal at normal seek operation to the power ampllifier 8. The output voltage should be a voltage signal whose maximum current is restrained to a predetermined value by the limiter 12 as is the case in prior art system. The power amplifier 8 supplies the driving current to the actuator motor 2 so that the motor 2 drives the carriage 1 at the velocity in normal seek operation. Other operations are same as those in FIG. 1, thereby omitting the descriptions thereof.

As described above, in this embodiment it is so constructed that the restrained value of the output voltage from the summing amplifier 7 are varied before and after the first seek operation and that the output voltage before the first seek operation is controlled to be lower than that after the first seek operation. Therefore, before the first seek operation, the maximum current to the actuator motor 2 is controlled to be lower so that the moving velocity of the carriage 1 is controlled to be lower than that at normal seek operation.

The applicants have found that most of the abnormal situations caused by the overrun of the motor 2 happen at first seek operation immediately after the power supply turns on. The overrun may be caused by an imperfect connection, mechanical malfunctions, malfunctions in circuitry and disconnection, and so on. The damage to the magnetic disk unit in the abnormal situations is greatest at the first seek operation where the distance the head moves is longest. Therefore, the large restraint of the maximum current to the actuator motor 2 and the maximum velocity of the carriage 1 to be largely lower than that at the normal seek operation prevent the damges of the magnetic disk unit caused the overrun of the actuator motor 2. Generally, at the first seek operation, the access time is out of consideration. Thus, no problems occur if the supplement of the driving current to the actuator motor 2 is restrained and the moving velocity of the carriage 1 is greatly reduced.

What is claimed is:

1. A magnetic head driving unit, comprising:
   magnetic head means;
   carriage means for implementing a seek operation of said magnetic head means;
   motor means for driving said carriage means;
   data processing means for determining whether the first seek operation is completed, which positions the head on a predetermined cylinder when the magnetic head driving unit is powered;
   analog switch means operated by a control signal from said data processing means after the determination; and
   driving current control means for restraining the driving current for the motor in a predetermined value at the first seek operation when said analog switch is ON, thereby restraining the maximum acceleration of said carriage means.

2. A magnetic head driving unit according to claim 1, wherein said data processing means is a microcomputer.

3. A magnetic head driving unit according to claim 1, wherein said driving current control means is a limiter.

* * * * *